(12) United States Patent
Hussain et al.

(10) Patent No.: US 8,030,795 B2
(45) Date of Patent: Oct. 4, 2011

(54) POWERED DEVICE FOR POWER OVER ETHERNET SYSTEM WITH INCREASED CABLE LENGTH

(75) Inventors: Asif Hussain, Tustin, CA (US); Sesha Thalpasai Panguluri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/830,919

(22) Filed: Jul. 6, 2010

(65) Prior Publication Data

US 2011/0004773 A1 Jan. 6, 2011

Related U.S. Application Data

(63) Continuation of application No. 11/984,621, filed on Nov. 20, 2007, now abandoned.

(60) Provisional application No. 60/924,141, filed on May 1, 2007.

(51) Int. Cl.
*G06F 1/26* (2006.01)

(52) U.S. Cl. .......................................................... 307/2

(58) Field of Classification Search ................ 307/1–3
See application file for complete search history.

(56) References Cited

U.S. PATENT DOCUMENTS

| | | | |
|---|---|---|---|
| 6,125,048 | A | 9/2000 | Loughran et al. |
| 7,170,194 | B2 | 1/2007 | Korcharz et al. |
| 7,404,091 | B1 | 7/2008 | Gere |
| 2005/0132240 | A1 | 6/2005 | Stineman et al. |
| 2005/0262364 | A1 | 11/2005 | Diab et al. |
| 2008/0172564 | A1 | 7/2008 | Diab et al. |
| 2008/0276104 | A1* | 11/2008 | Hussain et al. ............... 713/300 |
| 2008/0315682 | A1* | 12/2008 | Hussain ........................... 307/2 |
| 2011/0004773 | A1* | 1/2011 | Hussain et al. ............... 713/300 |

OTHER PUBLICATIONS

National Semiconductor News Release dated Jan. 16, 2006, "National Semiconductor Introduces Industry's First Single-Chip, Power over Ethernet Device Controller Designed for Low-Voltage Auxiliary Power Sources", obtained from http://www.national.com/news on Jun. 23, 2009.
MAXIM MAX5941A/MAX5941B, MAXIM IEEE 802.af-Complaint Power-Over-Ethernet Interface/PWM Controller for Power Devices: 19-3069; Rev 0; Oct. 2003, copyright 2003, MAXIM Integrated Products, Sunnyvale, CA; pp. 1-24.
Texas Instruments IEEE 802.3af POE Powered Device Controllers, SLVS525A-Apr. 2004-Revised Sep. 2004, TPS2375,2376,2377. Copyright 2004, Texas Instruments Incorporated, Dallas, Texas; pp. 1-21.
National Semiconductor LM5071 Power Over Ethernet PD Controller with Auxiliary Power Interface, Apr. 2006, DS201684, Copyright 2006, National Semiconductor Corporation; pp. 1-18.

* cited by examiner

*Primary Examiner* — Fritz M Fleming
(74) *Attorney, Agent, or Firm* — Sterne, Kessler, Goldstein & Fox, P.L.L.C.

(57) ABSTRACT

Increased cable length Power over Ethernet (PoE) systems are provided. Embodiments can be designed for compliance with IEEE 802.3af, IEEE 802.3at, or legacy PoE standards. Embodiments include PSE and PD designs enabled for increased length PoE. Embodiments include example modifications of IEEE 802.3af PSE system rules, including example modifications of PSE port voltage ranges to support IEEE 802.3af compliant PDs across increased cable lengths. Embodiments include example modifications of IEEE 802.3af PD system rules, including example modifications of PD port voltage ranges to enable current IEEE compliant PSEs to support increased cable length PoE. Embodiments include PDs having increased voltage process and/or added voltage protection circuitry to support increased length PoE. Modifications of PSE system rules and PD system rules can be performed independently of each others, so that modified PSEs can be made to work with existing PDs, or vice versa.

20 Claims, 11 Drawing Sheets

| Cable Length | Min Vclass | Max Vclass | Comments |
|---|---|---|---|
| 100m | 15.5v | 20.5v | Per IEEE802.3af |
| 350m | 18.07v | 20.5v | RCable=70 Ohm |
| 500m | 19.6v | 20.5v | Rcable=100 Ohm |

FIG. 3

| Cable Length | Min Vclass | Max Vclass | Comments |
|---|---|---|---|
| 100m | 15.5v | 20.5v | Per IEEE802.3af |
| 350m | 16.95v | 20.5v | RCable=70 Ohm |
| 500m | 18v | 20.5v | Rcable=100 Ohm |

FIG. 4

| Cable Length | Min Vport | Max Vport | Comments |
|---|---|---|---|
| 100m | 44v | 57v | Per IEEE802.3af |
| 350m | 64v | -- | RCable=70 Ohm |
| 500m | 76v | -- | Rcable=100 Ohm |

FIG. 5

| Cable Length | Power Loss | PSE to support | Comments |
|---|---|---|---|
| 100m | 2.45W | 15.4W | Per IEEE802.3af |
| 350m | 8.57W | 21.52W | RCable=70 Ohm |
| 500m | 12.25W | 25.2W | Rcable=100 Ohm |

POWERED DEVICE FOR POWER OVER ETHERNET SYSTEM WITH INCREASED CABLE LENGTH

CROSS-REFERENCE TO RELATED APPLICATIONS

The present application is a continuation of U.S. Application Ser. No. 11/984,621, filed Nov. 20, 2007, which claims the benefit of U.S. Provisional Patent Application No. 60/924,141, filed May 1, 2007, both of which are incorporated herein by reference in their entirety.

The present application is related to U.S. patent application Ser. No. 11/987,644, which claims the benefit of U.S. Provisional Patent Application No. 60/929,352, filed Jun. 22, 2007, which is incorporated herein by reference in its entirety.

BACKGROUND OF THE INVENTION

1. Field of the Invention

The present invention relates generally to Power over Ethernet (PoE), and more particularly to PoE with increased cable lengths.

2. Background Art

Ethernet communications provide high speed communications between data terminals.

Power over Ethernet (PoE) systems enable power transmission over the same transmission lines that carry data in an Ethernet. Generally, power is generated at a Power Source Equipment (PSE) side of the PoE system and is carried over the data transmission lines to a Powered Device (PD) side of the PoE System.

A PSE controller is typically used at the PSE side to enable power management functions of the PD. For example, a PSE controller may be used to detect whether a valid PD device is active and to manage power flow to the PD. Further, at either side of a PoE system, a transceiver physical layer (PHY) is available to transmit and receive data over the transmission lines.

Current IEEE compliant PoE systems support cable lengths up to approximately 100 meters only. There is a need therefore for improved PoE systems that support greater cable lengths.

BRIEF SUMMARY OF THE INVENTION

Increased cable length Power over Ethernet (PoE) methods and systems are provided herein.

Embodiments can be designed for compliance with IEEE 802.3af, IEEE 802.3at, or legacy PoE standards.

Embodiments include PSE controller designs enabled for increased length PoE, which require minimal or no modification of existing PD designs.

Embodiments include example modifications of IEEE 802.3af PSE system rules revised for increased cable length applications, including example modifications of PSE port voltage ranges to support IEEE 802.3af compliant PDs across increased cable lengths.

Embodiments include PDs having increased voltage process and/or added voltage protection circuitry to support increased length PoE.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Overview

Current IEEE 802.3af compliant PoE systems support cable lengths up to approximately 100 meters only. There is a need therefore for improved PoE systems that support greater cable lengths.

Increased cable length Power over Ethernet (PoE) methods and systems are provided herein. Embodiments can be designed for compliance with IEEE 802.3af, IEEE 802.3at, and/or legacy PoE standards. Embodiments include PSE and PD designs enabled for increased length PoE.

INTRODUCTION

Figure 1:
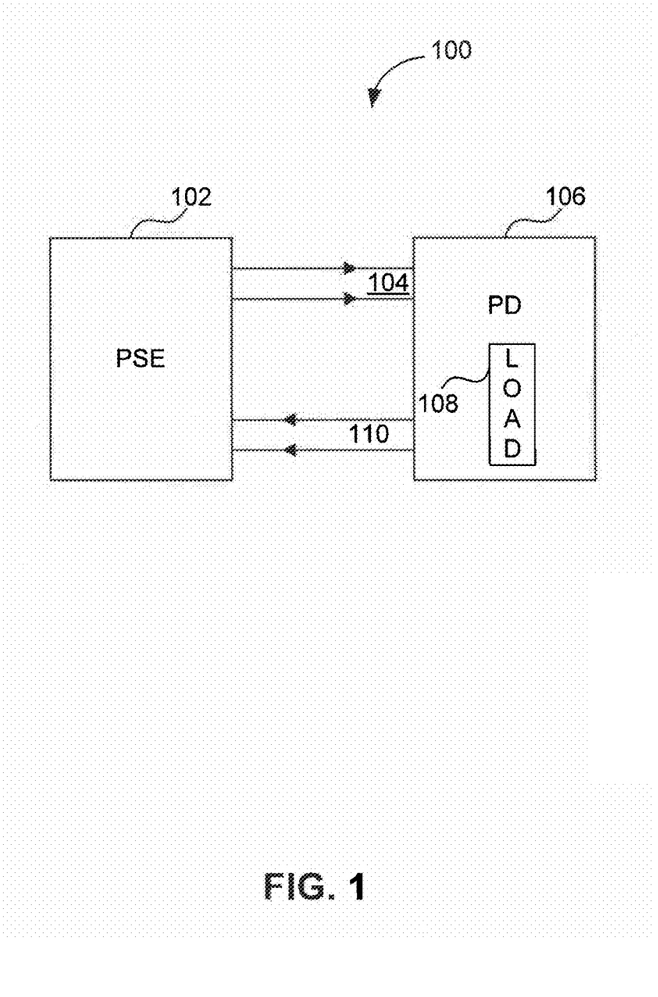
FIG. 1 is an overview of a Power over Ethernet (PoE) system.

FIG. 1 illustrates a high level diagram of a conventional Power over Ethernet (PoE) system 100 that provides DC power over a common data communications medium. Referring to FIG. 1, power source equipment 102 provides DC power over conductors 104, 110 to a powered device (PD) 106 having a representative electrical load 108. Accordingly, the power transfer between the PSE 102 and the PD 106 occurs simultaneously with the exchange of high speed data over the conductors 104, 110. In one example, the PSE 102 when used with a switching and PHY chip is a data switch having multiple ports that is communicating with one or more PD devices, such as Internet phones, wireless access points, etc.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 1 Gigabit Ethernet. In 10/100 Ethernet, only two of the four pairs carry data communications, and the other two pairs of conductors are unused. Herein, conductor pairs may be referred to as Ethernet cables or communication links or structured cabling for ease of discussion. The conductor pairs may be CAT-5 cable for example.

Figure 2:
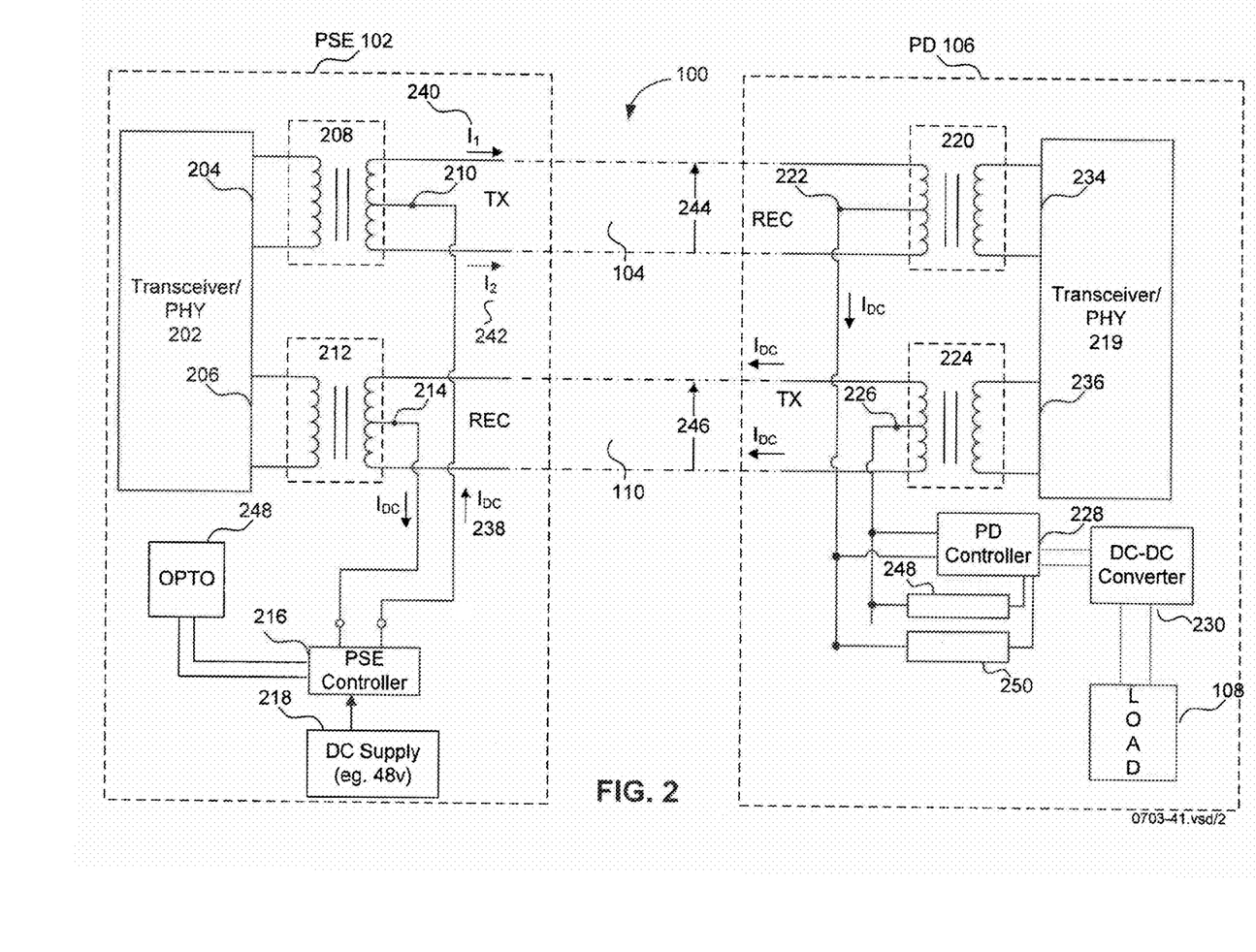
FIG. 2 is a more detailed view of a PoE system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive to large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC output voltage is applied across the respective center taps (e.g. 210, 214) of the transformers 208 and 210 on the conductor side of the transformers. An example DC output voltage for the DC supply 218 is 48 volts, but other voltages could be used depending on the voltage/power requirements of the PD 106.

The PSE 102 further includes a PSE controller 216 which performs the power management functions based on the dynamic needs of the PD 106. More specifically, the PSE controller 216 measures the voltage, current, and temperature, etc so as to characterize the power requirements of the PD 106.

Further, the PSE controller 216 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. The IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 side includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (e.g. 3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 216 will recognize the PD as a valid PoE device, and be able to classify its power requirements. FIG. 2 also illustrates a signature resistor 248 and a classification resistor 250 connected to PD 106. Signature resistor 248 is used to validate the PD 106, and the classification resistor 250 is used for classifying PD 106 and to limit current for classification.

During ideal operation, a direct current (IDC) 238 flows from the PSE Controller 216 through the first center tap 210, and divides into a first current (I1) 240 and a second current (I2) 242 that are carried over conductor pair 104. The first current (I1) 240 and the second current (I2) 242 then recombine at the third center tap 222 to reform the direct current (IDC) 238 so as to power PD 106. On return, the direct current (DC) 238 flows from PD 106 through the fourth center tap 226, and divides for transport over conductor pair 110. The return DC current recombines at the second center tap 214, and returns to the DC power supply 218.

As discussed above, data transmission between the PSE 102 and the PD 106 occurs simultaneously with the power as described above. Accordingly, a first communication signal 244 and/or a second communication signal 246 are simultaneously differentially carried via the conductor pairs 104 and 110 between the transceivers or PHY of PSE 102 and the PD 106. It is important to note that the communication signals 244 and 246 are differential signals that ideally are not effected by the DC power transfer described above. However, the signaling used by the PSE controller is based on common mode signaling so it does not interfere with data transmission.

In order to conduct its management and control of PD 106, PSE 102 analyzes certain characteristics of PD 106, and the system as a whole, based on measurements taken at PD 106. Based on those characteristics, PSE 102 can determine certain attributes of PD 106 as well as attributes of the system. Example attributes determined by PSE 102 can include, but are not limited to, the following: valid device detection, power classification, AC disconnect information, short circuit detection, PD load variations, various current measurements, overload conditions, and inrush conditions.

Increased Length Power Over Ethernet (PoE) System

Current IEEE compliant PoE systems support cable lengths up to approximately 100 meters only. As such, to support greater cable lengths, modified PSE and PD interfaces are needed.

In the teachings herein, several example embodiments for enabling increased length PoE systems are provided. These embodiments are provided for the purpose of illustration and are not limiting of the scope of the present invention. Further, embodiments will be described with respect to IEEE compliant systems (e.g., IEEE 802.3af and IEEE 802.3at). However, embodiments of the present invention are, not limited to IEEE compliant systems and can be extended to legacy PoE systems having their own defined system rules.

One problem that is encountered in supporting increased length IEEE compliant PoE systems includes the increased resistance of the Ethernet cable (e.g., a CAT-5 cable) that connects the PSE and the PD. Indeed, IEEE compliant PSEs are designed to operate with a CAT-5 cable having a maximum length of approximately 100 meters. As such, IEEE compliant PSEs are designed to compensate for a maximum cable resistance of approximately 20 Ohms when supporting IEEE compliant PDs in current PoE systems. This compensation includes compensating for the voltage drops that could occur across the 20 Ohms resistance during each of the different operational phases (e.g., detection, classification, etc.) of the PoE system.

Accordingly, when the cable length (and correspondingly the cable resistance) is increased, compliance with IEEE requires modification of system rules at the PSE to enable the same operational voltages at the PD.

Examples of modification of PSE systems rules according to an embodiment of the present invention will now be described with respect to FIGS. 3-6. These examples are provided with respect to two exemplary PoE embodiments having increased cable length of 350 and 500 meters, respectively. These examples are provided for the purpose of illustration and are not limiting of the scope of the present invention. As would be understood by a person skilled in the art based on the teachings herein, these examples can be extended to support PoE systems having any cable length up to a maximum supported by the PSE process or different load currents as will be specified by IEEE 802.3af.

Figure 3:
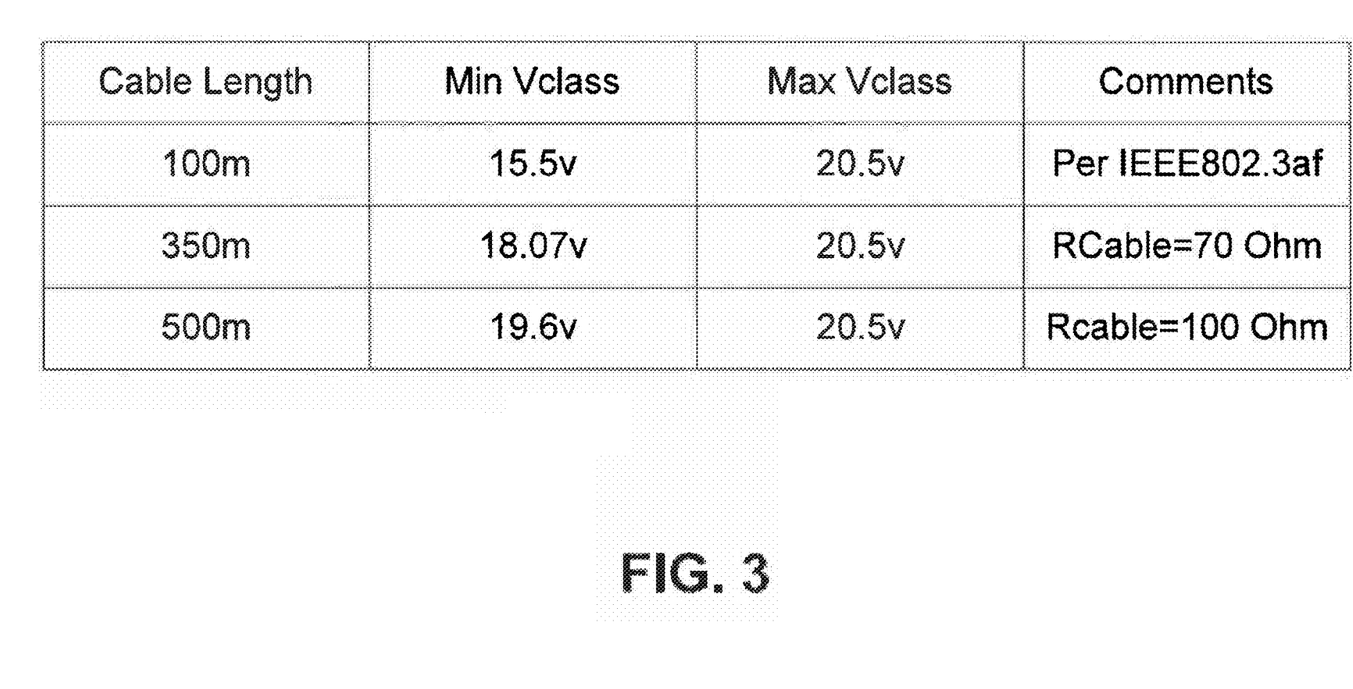
FIG. 3 illustrates required PSE classification voltage ranges in example increased length PoE systems.
Figure 4:
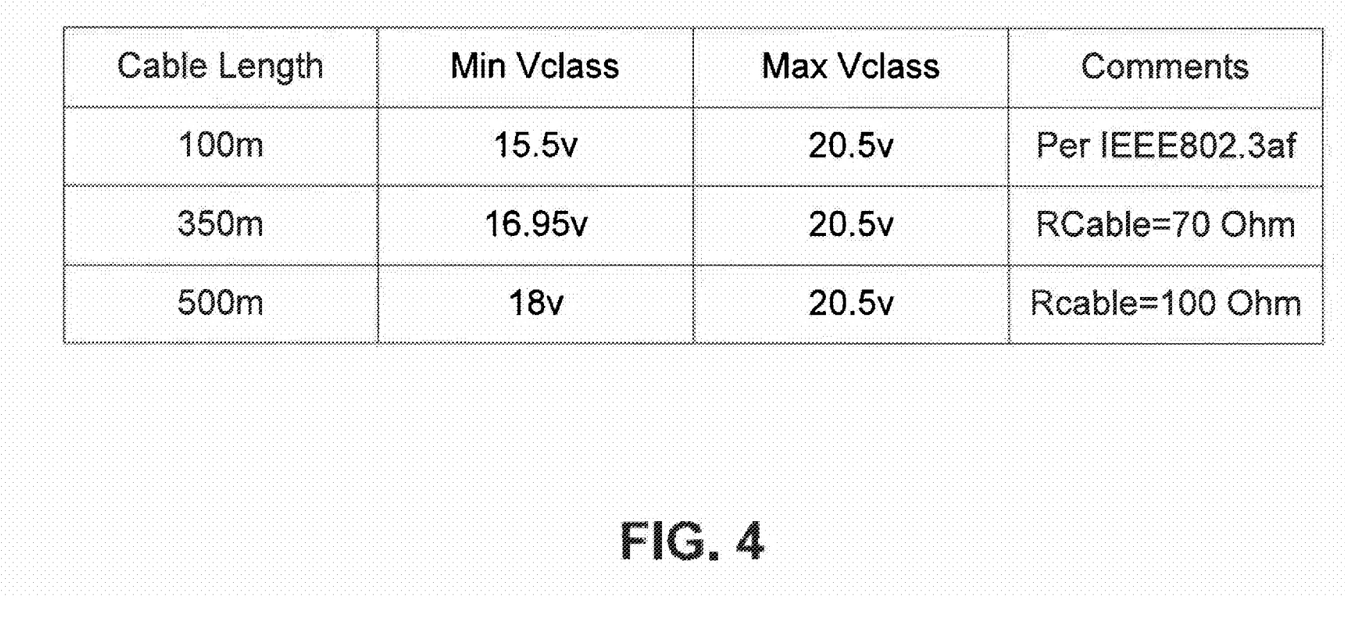
FIG. 4 illustrates required PSE classification voltage ranges in example increased length PoE systems.

FIG. 3 illustrates PSE classification voltage ranges for the two exemplary PoE embodiments with increased cable length. FIG. 3 also illustrates the required PSE classification voltage range in a typical IEEE compliant PoE system. This range according to IEEE 802.3af should be between a minimum of 15.5 volts and a maximum of 20.5 volts. It is noted that this required classification voltage range is specified based on a maximum cable length of 100 meters (or equivalently a 20 Ohms resistance) to provide valid classification voltages at the PD (typically, a valid classification voltage at the PD is between 14.5 volts and 20.5 volts).

As such, when the cable length is increased, the PSE classification voltage range needs to be modified to compensate for the increased cable resistance. In an embodiment, this includes increasing the minimum end of the classification voltage range according to the maximum possible added voltage drop due to the increase in cable resistance. In other words, this includes increasing the minimum end of the classification voltage range by the added voltage drop due to the maximum possible current during the classification phase of an IEEE compliant PoE system.

Table 33-4 (not shown) of the IEEE 802.3af standard specifies the maximum current during classification to be equal to 51 milliamps in a PoE system that supports PDs of class 0 to 4. Accordingly, the resulting classification voltage ranges for the exemplary PoE systems with cable length of 350 and 500 meters are as shown in FIG. 3. For example, for a cable length of 350 meters, the minimum end of the classification voltage range at the PSE is equal to 14.5+(51 milliamps× 70 Ohms)≈18.07 volts, to provide the proper voltage at the PD. Similarly, for a cable length of 500 meters, the minimum end of the classification voltage range at the PSE is equal to 14.5+(51 milliamps×100 Ohms)≈19.6 volts, to provide the proper voltage at the PD.

It is noted, however, that current IEEE compliant PoE systems do not allow the usage of PDs of class 4, which is specified as "reserved" in the IEEE 802.3af standard. To be IEEE 802.3af compliant a PSE therefore only requires support of PDs of class 0 to 3. As such, the maximum current during classification with respect to which added voltage drops need to be calculated is only 35 milliamps, instead of 51 milliamps when class 4 is used. Based on that, compliance with IEEE can also be achieved using the PSE classification voltage ranges illustrated in FIG. 4, which are calculated according to a maximum current during classification of 35 milliamps.

It is noted that in other aspects classification in increased length PoE systems remain substantially similar to classification in current PoE systems. For example, the classification phase duration remains as specified in IEEE 802.3af (less than or equal to 75 milliseconds). Also, the classification current limit (less than or equal to 100 milliamps) remains as specified in IEEE 802.3af. Similarly, the detection phase remains as specified in IEEE 802.3af, with the increased cable resistance added to the PD resistor signature and compensated for at the PSE.

Figure 5:
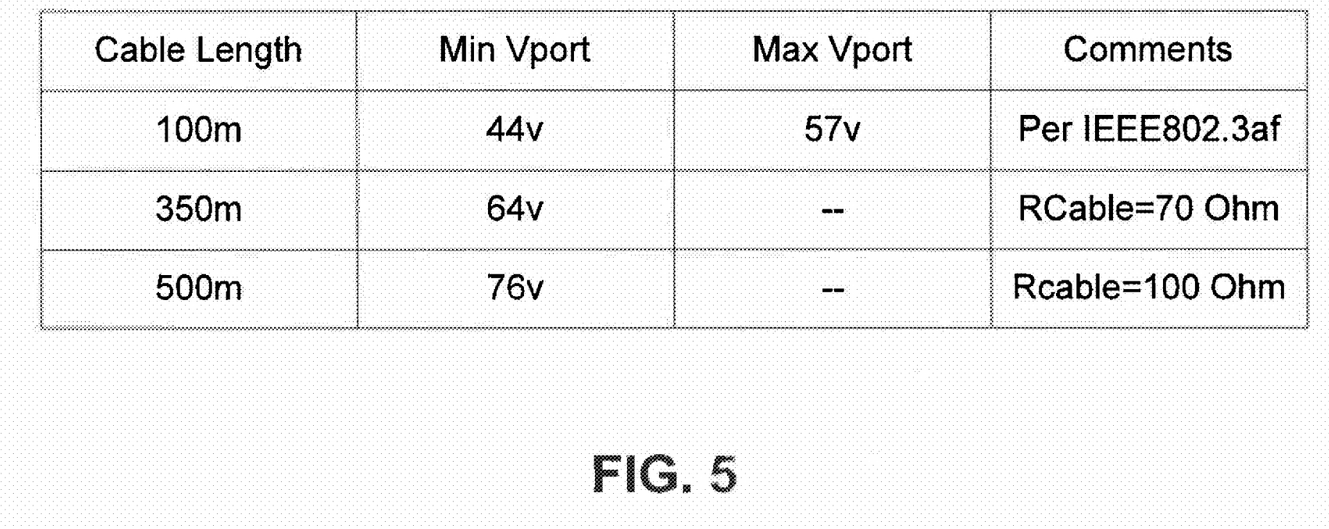
FIG. 5 illustrates required PSE post start up voltage ranges in example increased length PoE systems.

As with classification voltage ranges, however, post start up voltage ranges need to be modified to enable increased cable length IEEE compliant PSEs. FIG. 5 illustrates PSE post start up voltage ranges for the two exemplary PoE embodiments with increased cable length. FIG. 5 also illustrates the required PSE post start up voltage range in a typical IEEE compliant PoE system. This range according to IEEE 802.3af should be between a minimum of 44 volts and a maximum of 57 volts. As illustrated, this required post start up voltage range is specified based on a maximum cable length of 100 meters (or equivalently a 20 Ohms resistance) to provide valid post start up voltages at the PD (typically, a valid post start up voltage at the PD is between 36 volts and 57 volts).

In an embodiment, the minimum end of the PSE post start up voltage range is increased according to the maximum possible added voltage drop due to the increase in cable resistance. This includes increasing the minimum end of the post start up voltage range by the added voltage drop due to the maximum possible current during the post start up phase of an IEEE compliant PoE system. As would be understood by a person skilled in the art based on the teachings herein, increasing the PSE post start up voltage range is only possible up to the maximum sustainable voltage of the PSE process. For example, current IEEE compliant PSE processes are required to sustain up to 57 volts. However, PSEs with higher voltage process can be designed.

IEEE 802.3af specifies the maximum load current during post start up to be equal to 350 milliamps and an in-rush current of 400 milliamps. Accordingly, the resulting PSE post start up voltage ranges are as shown in FIG. 5. For example, for a cable length of 350 meters, the minimum end of the start up voltage range is equal to 36+(400 milliamps× 70 Ohms)=64 volts, where 36 volts is the minimum port voltage at the PD side. Similarly, for a cable length of 500 meters, the minimum end of the start up voltage range is equal to 36+(400 milliamps×100 Ohms)=76 volts. These exemplary PSE start up voltage ranges guarantee valid post start up port voltages at the PD.

In addition to ensuring valid port voltages at the PD, IEEE compliance also necessitates compliance with power requirements at the PD. IEEE 802.3af specifies a maximum power level of 12.95 Watts at the PD for PDs of class 0 to 3. With a cable length of 100 meters, this implies that the PSE should be able to support 15.4 Watts, as approximately a maximum of 2.45 Watts could dissipate in the cable (7 volts×350 milliamps=2.45 Watts) due to cable resistance.

Figure 6:
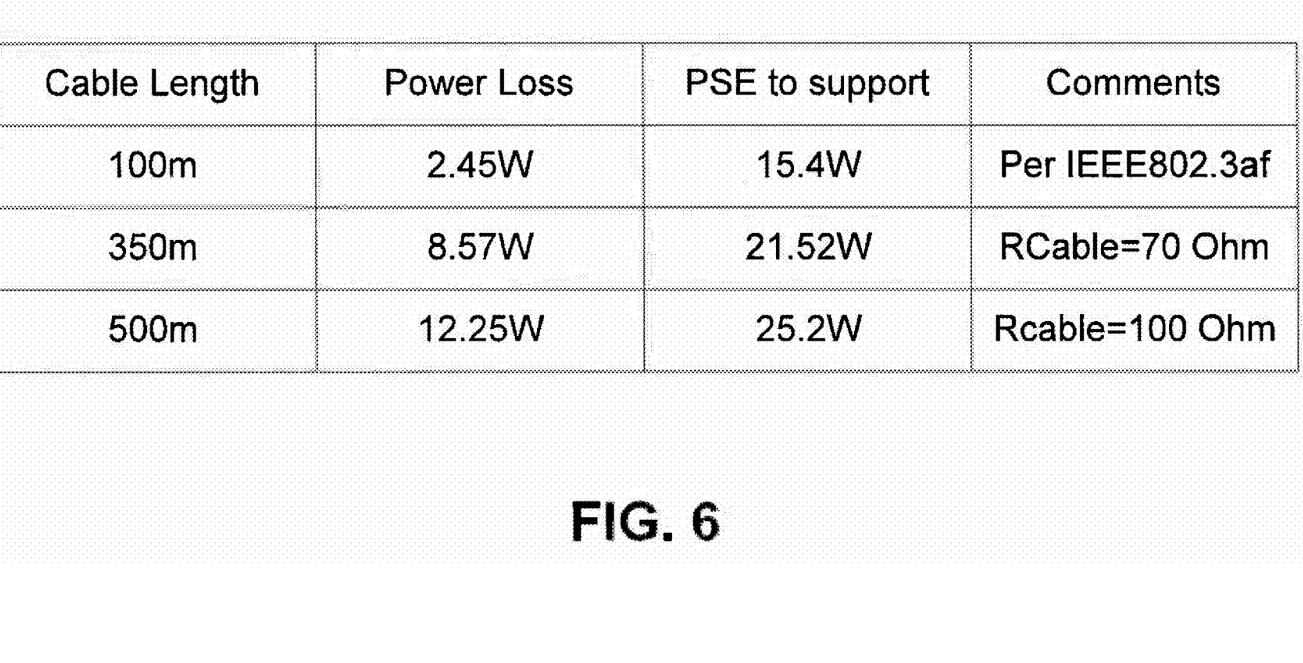
FIG. 6 illustrates required PSE power requirements and cable power loss in example increased length PoE systems.

With greater cable length, larger power dissipation in the cable will occur. Consequently, the PSE will be required to support greater power outputs. This is shown in FIG. 6, which illustrates required PSE power requirements and cable power loss in example increased length PoE systems. *For example, for a cable length of* 350 meters, the PSE will be required to support 21.52 Watts as a maximum of 8.57 Watts (24.5 volts× 350 milliamps=8.57 Watts) could dissipate in the cable. Similarly, for a cable length of 500 meters, the PSE will be required to support 25.2 Watts as a maximum of 12.25 Watts (35 volts×350 milliamps=12.25 Watts) could dissipate in the cable due to cable resistance.

Note that similar cable power loss figures (8.57 Watts and 12.25 Watts) as above are currently being studied by IEEE 802.3at task force in approving a cable plant that proposes supporting up to 720 milliamps, which approximates a cable loss of 10.3 Watts for a cable of length 100 meters.

The above described example embodiments describe PSE IEEE compliance requirements to enable increased length PoE systems. As noted above, similar PSE compliance requirements can be created for increased length PoE systems that comply with legacy PoE standards. These PSE compliance requirements ensure that valid port voltages are received at the PD in view of the maximum possible cable current. However, to fully enable increased length PoE systems, the PD process will need to be able to support the increased PSE voltage ranges at all times (regardless of the value of the cable current). This problem will be illustrated with respect to FIGS. 7 and 8.

Figure 7:
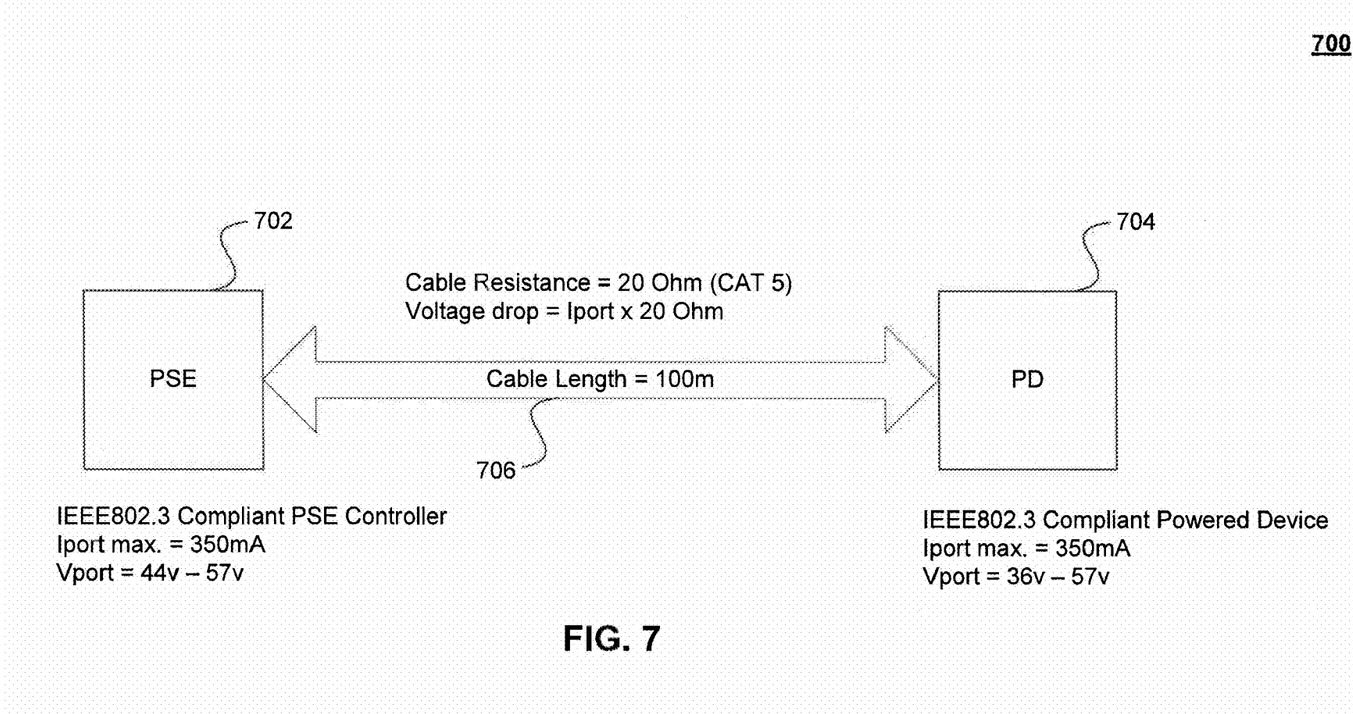
FIG. 7 illustrates an IEEE compliant PoE system.

FIG. 7 illustrates an IEEE compliant PoE system 700. PoE system 700 includes an IEEE compliant PSE 702 and an IEEE compliant PD 704, connected by a CAT-5 cable 706 having a length of 100 meters.

A maximum compliant current of 350 milliamps is allowed over cable 706 during the post start up phase. As such, a maximum voltage drop of 7 volts can occur over cable 706. Accordingly, PSE 702 is required to support a minimum port voltage of 44 volts to enable a minimum port voltage of 36 volts at PD 704 (a drop of approximately 1 volt occurs across a diode prior to the PD input port).

Note, however, that the required maximum PSE port voltage is only 57 volts, which is also approximately the maximum voltage supported by current IEEE compliant PD processes. As such, notwithstanding the value of the cable current (or equivalently the voltage drop across cable 706), the PD port voltage will always be within an allowable maximum voltage of the PD process.

Figure 8:
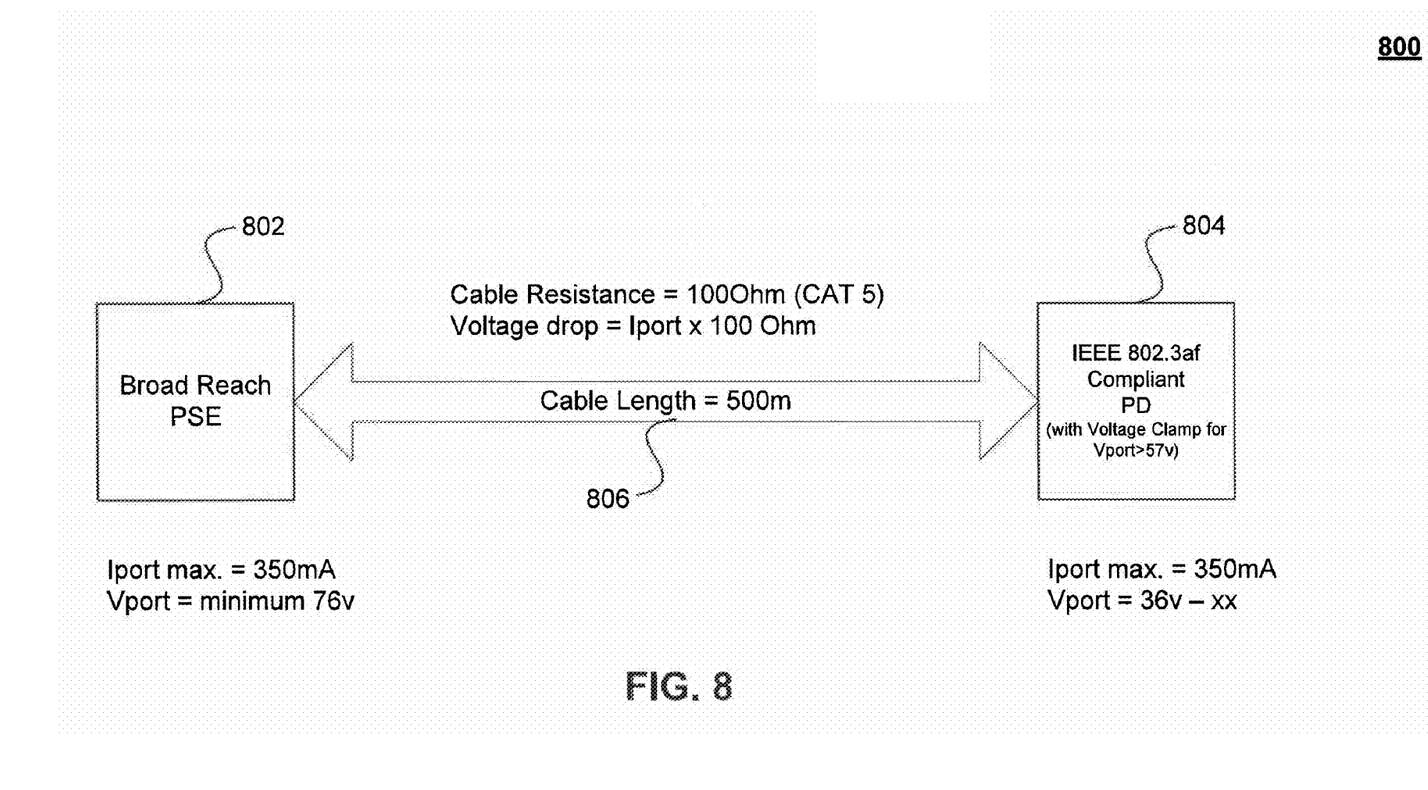
FIG. 8 illustrates an example increased length PoE system.

FIG. 8 illustrates an example increased length PoE system 800. PoE system 800 includes a PSE 802 and PD 804, connected by a CAT-5 cable 806 having a length of 500 meters.

PSE 802 is enabled to support increased cable length up to 500 meters. For example, PSE 802 supports a minimum port voltage of 76 volts during the start up phase to provide a minimum port voltage of 36 volts at PD 804 (a maximum voltage drop of 40 volts occurs across cable 806).

PD 804 is an IEEE compliant PD with a typical process that supports voltages up to 57 volts.

Note that the minimum supported port voltage at PSE 802 (76 volts) is greater than the maximum supported voltage of the PD process (57 volts). Based on that, if the voltage drop across cable 806 is less than 19 volts (or equivalently the cable current is less than 190 milliamps), the port voltage at PD 804 will exceed the maximum supported operating voltage and PD 804 can be damaged. In practice, this could happen during start up before PD 804 is fully loaded to draw the maximum cable current of 350 milliamps, or if PD 804 requires less than 7 Watts during start up.

Accordingly, there is a need to protect PDs from potentially non-tolerable port voltages in increased length PoE systems. The protection may be necessary if (a) PD in-rush current is <400 mA; or (b) PD load current is <190 mA.

One solution is to design the PD chip such that it is capable of tolerating higher port voltages that are at least equal to the minimum supported PSE port voltage. In example system 800, this implies that the PD should be able to support voltages up to 76 volts.

Another solution is to incorporate voltage clamping circuitry at the PD side such that PD port voltages are clamped down to within the supported PD voltage range whenever they exceed the maximum supported PD voltage. Example embodiments that implement this solution will now be described. These example embodiments are provided for the purpose of illustration and are not limiting of the scope of the present invention. As will be appreciated by a person skilled in the art based on the teachings herein, other embodiments to incorporate this or similar solutions are possible and are also within the scope of the present invention.

Figure 9:
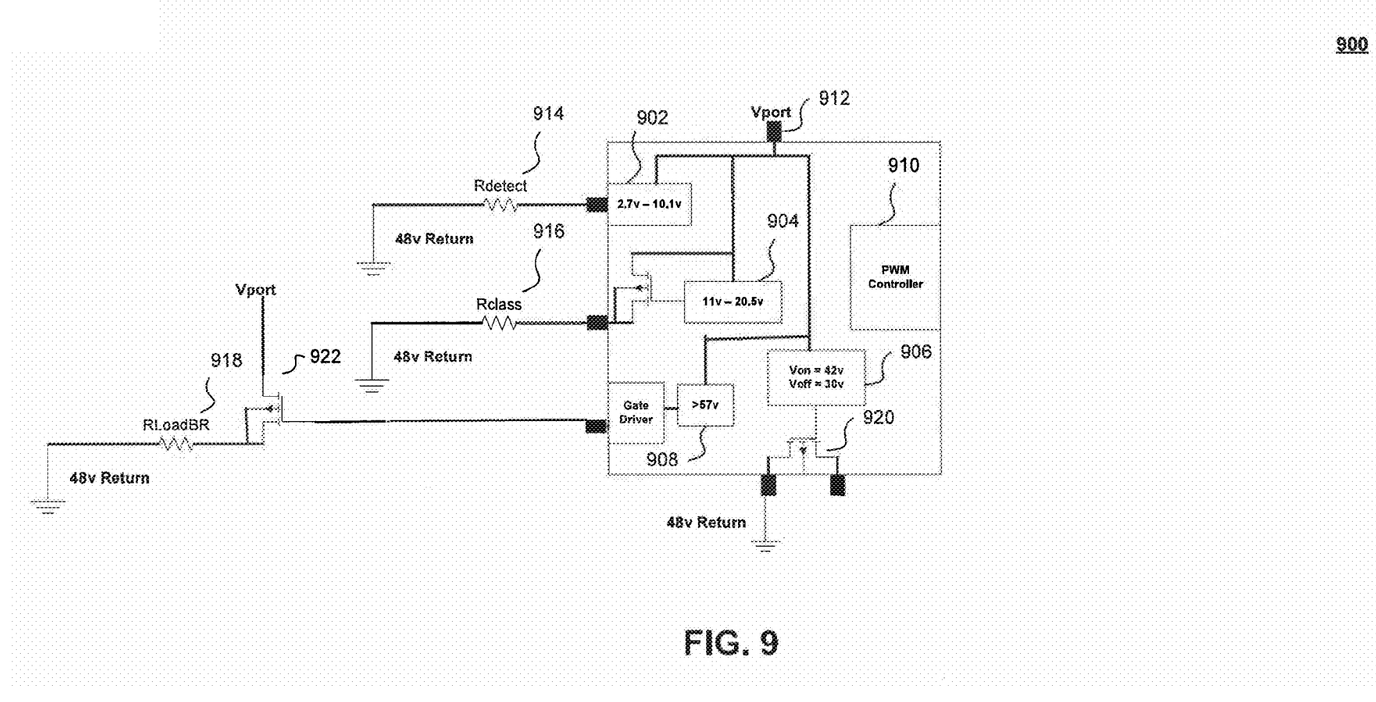
FIG. 9 illustrates an example powered device (PD) chip usable in an increased length PoE system.

FIG. 9 illustrates an example powered device (PD) chip 900 usable in an increased length PoE system. Example PD chip 900 includes a plurality of circuits 902, 904, 906, and 908 and a Pulse Width Modulation (PWM) Controller 910.

Circuits 902, 904, 906, and 908 are each connected to a port voltage $V_{port}$ 912 of PD chip 900. Each of these circuits 902, 904, 906, and 908 is triggered when $V_{port}$ 912 is within the voltage range associated with it. For example, circuit 902 is triggered when $V_{port}$ 912 is within the voltage range of 2.7-10.1 volts to connect $V_{port}$ 912 through resistor $R_{detect}$ 914 to the ground terminal. Similarly, circuit 904 is triggered when $V_{port}$ 912 is within the voltage range of 11-20.5 volts to connect $V_{port}$ 912 through resistor $R_{class}$ 916 to the ground terminal.

Circuits 902 and 904 are used during the detection phase and the classification phase, respectively, which occur prior to power transfer in a PoE system. As such, $R_{detect}$ 914 and $R_{class}$ 916 correspond respectively to the signature resistor and the classification resistor of PD chip 900. In example embodiment 900, $R_{detect}$ 914 and $R_{class}$ 916 are shown as implemented externally to PD chip 900. In other embodiments, $R_{detect}$ 914 and $R_{class}$ 916 can be integrated within PD chip 900.

Circuit 906 is used for the start up phase in PoE system 900. Typically, in normal operating conditions, $V_{port}$ 912 is between 36 volts and a maximum of 57 volts during the start up phase. IEEE 802.3af specifies a minimum PD shut down voltage of 30 volts, i.e., the PD chip must shut down if $V_{port}$ 912 is approximately 30 volts and falling. Similarly, IEEE 802.3af specifies a maximum PD turn on voltage of 42 volts, i.e., the PD must turn on at this voltage.

When triggered, circuit 906 connects $V_{port}$ 912 through a Hot Swap MOSFET 920 to a PD load (not shown in FIG. 9). Hot Swap MOSFET 920 can be implemented within or outside PD chip 900.

In current IEEE compliant PoE systems having a cable length of 100 meters or less, circuits 902, 904, and 906 are sufficient for safe PD operation. This is because $V_{port}$ 912 cannot exceed 57 volts, and consequently no precautions are needed to deal with $V_{port}$ 912 levels higher than 57 volts. This does not take transients into considerations. However, as described above, in increased length PoE systems, such precautions will be needed unless the PD process is designed to support higher voltages.

Figure 11:
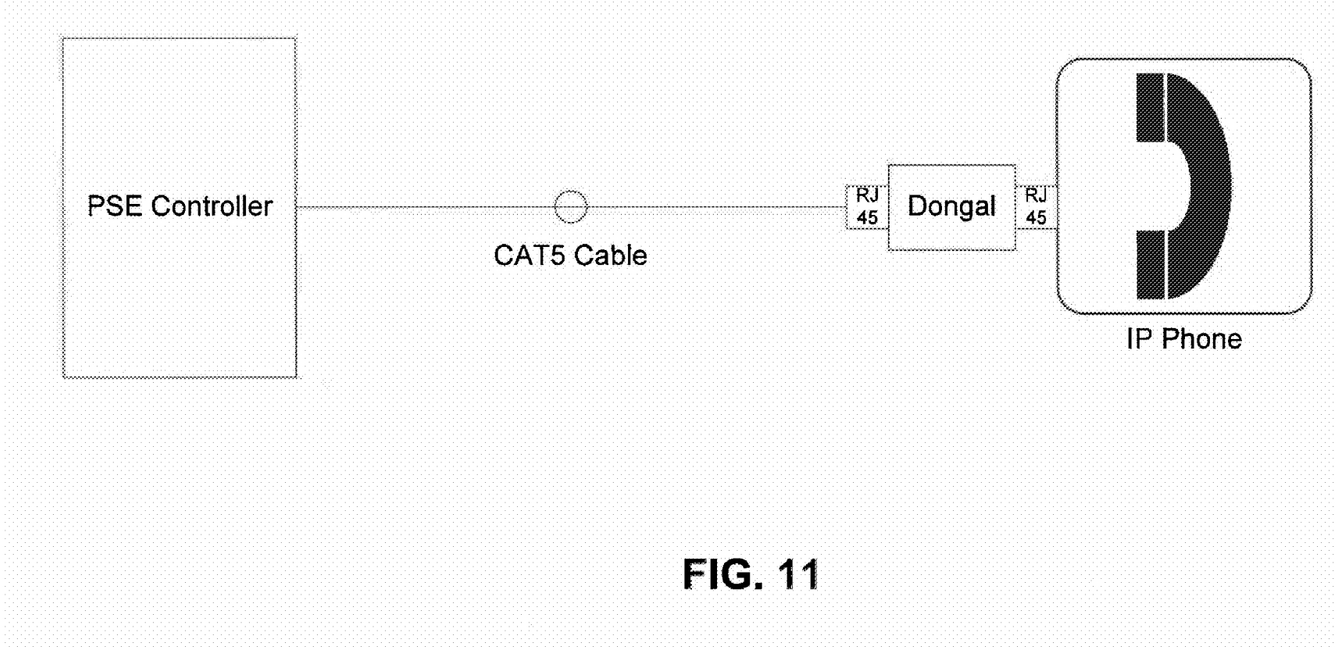
FIG. 11 illustrates an example implementation of a clamping circuit by means of a dongle.

In example embodiment 900, this is achieved using a clamping circuit, which is formed by circuit 908, a MOSFET 922, and a resistor $R_{LoadBR}$ 918. The clamping circuit operates to clamp $V_{port}$ 912 to cause it to remain within the supported PD voltage range (<57 volts). In other words, the clamping circuit connect a dummy load when $V_{port}$>57 volts. The clamping circuit can be implemented within the PD chip, or alternatively, it can be implemented outside the PD chip. Note that different values of $R_{LoadBR}$ 918 can be used for different power classes of PDs. An example implementation of the clamping circuit can be in the form of a dongle. The dongle can be used to enhance existing IEEE compliant PDs so that they can support increased cable length PSE controllers. An example implementation 1100 of a voltage clamping circuit within a dongle is illustrated in FIG. 11.

Figure 10:
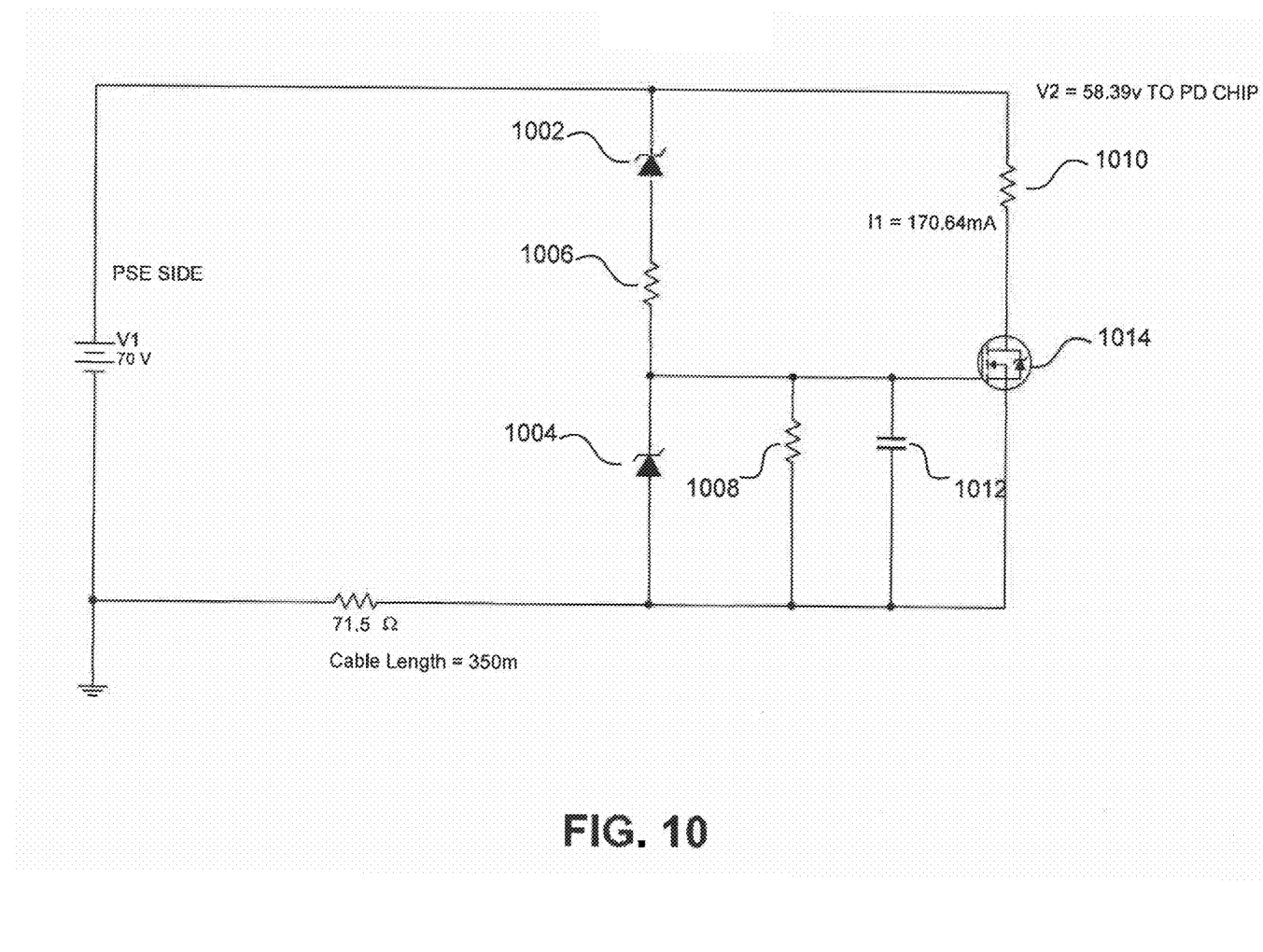
FIG. 10 illustrates an example implementation of a clamping circuit that can be used within the example PD chip of FIG. 8.

FIG. 10 illustrates an example implementation 1000 of a clamping circuit. Example clamping circuit 1000 is an external clamping circuit implementation, which can be used with current IEEE compliant PD chips to enable them for use in increased length PoE systems. However, as would be appreciated by a person skilled in the art based on the teachings herein, example implementation 1000 can also be readily implemented within a PD chip, as illustrated in FIG. 9, to provide an increased length IEEE compliant PD chip.

Example clamping circuit 1000 includes a first diode 1002, a second diode 1004, resistors 1006, 1008, and 1010, a capacitor 1012, and an n-channel MOSFET transistor 1014.

Diode 1002 is a Zener diode having a Zener voltage of approximately 56 volts. Accordingly, current would flow in the reverse direction (from the cathode to the anode) through diode 1002 only when the voltage across diode 1002 (measured from the cathode to the anode) reaches 56 volts. The voltage across diode 1002 (measured from the cathode to the anode) cannot exceed 56 volts. Similarly, diode 1004 is a Zener diode having a Zener voltage of approximately 20 volts. Reverse current would flow though diode 1004 only when the voltage across diode 1004 (measured from the cathode to the anode) reaches 20 volts. The voltage across diode 1004 (measured from the cathode to the anode) cannot exceed 20 volts.

Clamping circuit 1000 operates as will now be described with respect to FIG. 10.

When the received PSE voltage is less than 56 volts, no current flows through diode 1002. As such, assuming capacitor 1012 is initially uncharged, the gate-to-source voltage of MOSFET 1014 will be less than the threshold voltage $V_t$ of MOSFET 1014. MOSFET 1014 will thus be operating in cut-off state, thereby acting as an open circuit. Accordingly, the received PSE voltage will be directly coupled to the PD load (not shown in FIG. 10).

As the received PSE voltage exceeds 56 volts, current begins to flow through diode 1002 since the anode of diode 1002 initially sits at zero voltage. However, the current cannot flow (in the reverse direction) through diode 1004. Instead, the current will flow through resistor 1008 and will cause a conduction current within capacitor 1012, charging capacitor 1012.

When the voltage across capacitor 1012 reaches or exceeds the threshold voltage $V_t$ of MOSFET 1014, current will start to flow through MOSFET 1014. In an embodiment, resistance in the path formed by resistor 1010 and MOSFET 1014 will be much lower than the resistance in the path formed by diode 1002, resistor 1006, and resistor 1008, and the bulk of the current received from the PSE will flow through resistor 1010 and MOSFET 1014. Only a very low current therefore will flow through diode 1002, resistor 1006, and resistor 1008, causing the voltage across that path to be just higher than 56 volts and clamping the voltage provided to the PD load.

FIG. 10 provides an example operation snapshot of clamping circuit 1000 when the received PSE voltage is equal to 70 volts. The shown example assumes a cable length of 350 meters having a resistance of approximately 70.5 Ohms. Resistors 1006, 1008, and 1010 have values of 51 KOhms, 240 KOhms, and 220 Ohms, respectively, and capacitor 1012 has a value of 100 nanoFarads. As shown, the PD voltage is clamped to approximately 58 volts. Note that the value of resistor 1010 will depend upon the power class of the PD and therefore can be adjusted accordingly.

As noted above, example clamping circuit 1000 is provided herein for the purpose of illustration. As such, components and/or component values used in example clamping circuit 1000 are only exemplary. Equivalent clamping circuits, as would be appreciated by a person skilled in the art based on the teachings herein, can alternatively be used and are also within the scope of embodiments of the present invention. Further, example clamping circuit 1000 can be designed with configurable and/or variable components and/or component values. As such, example clamping circuit 1000 can be configured according to, among other parameters, the maximum supported PD voltage and/or the cable length of the PoE system.

Using the above described PD voltage clamping approach or by designing the PD chip to support higher port voltages, increased length PDs can be enabled. However, it is also necessary to ensure that increased length PDs operate properly with both current IEEE compliant PSEs and with PSEs enabled for increased length PoE. In other words, it is desirable that increased length PDs operate properly notwithstanding their knowledge of the type of PSE used.

As described above, PSEs enabled for increased length PoE compensate for cable voltage drop in their outputs. As such, port voltages at the PD will always be within expected IEEE compliant port voltage ranges. On the other hand, if a current IEEE compliant PSE is used, port voltages at the PD can be lower than the expected IEEE compliant port voltage ranges. As such, modifications of some of the port voltage ranges may be required in increased length PDs.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A powered device (PD), comprising:
   an input port that receives a port voltage;
   a first circuit, coupled to the input port, configured to couple the port voltage to a detection resistor when the port voltage is within a detection voltage range;
   a second circuit, coupled to the input port, configured to couple the port voltage to a classification resistor when the port voltage is within a classification voltage range;

a third circuit, coupled to the input port, configured to couple the port voltage to a PD load when the port voltage is within a start up voltage range; and a fourth circuit, coupled to the input port, configured to clamp down the port voltage to within a supported port voltage range of the PD when the port voltage exceeds a maximum of the supported port voltage range.

2. The PD of claim 1, wherein one or more of the first, second, third, and fourth circuit is integrated within a PD chip of the PD.

3. The PD of claim 2, wherein one or more of the detection resistor and the classification resistor is integrated within the PD chip.

4. The PD of claim 2, wherein one or more of the detection resistor and the classification resistor is external to the PD chip.

5. The PD of claim 1, wherein the start up voltage range includes a minimum of 36 volts and a maximum of 57 volts.

6. The PD of claim 2, wherein the third circuit couples the port voltage to the PD load via a Hot Swap MOSFET when the port voltage is within the start up voltage range.

7. The PD of claim 6, wherein the Hot Swap MOSFET is integrated within the PD chip or external to the PD chip.

8. The PD of claim 1, wherein the supported port voltage range is that supported by a process of an IEEE compliant PD.

9. The PD of claim 1, wherein the maximum of the supported port voltage range is 57 volts.

10. The PD of claim 1, wherein the maximum of the supported port voltage range is equal to a maximum of the start up voltage range.

11. The PD of claim 1, wherein the fourth circuit is triggered to clamp down the port voltage when a PD in-rush current during a start up phase of the PD is lower than a predetermined value.

12. The PD of claim 1, wherein the fourth circuit is triggered to clamp down the port voltage when a current drawn by the PD load is lower than a maximum post start up load current.

13. The PD of claim 12, wherein the maximum post start up load current is specified by IEEE 802.3af.

14. The PD of claim 1, wherein the input port receives the port voltage over a cable from a power source equipment (PSE).

15. The PD of claim 14, wherein the fourth circuit is triggered to clamp down the port voltage when a voltage drop across the cable is lower than a difference between a voltage provided by the PSE and the maximum of the supported port voltage range of the PD.

16. The PD of claim 15, wherein the fourth circuit is triggered when a current drawn by the PD load is not sufficiently high to cause the voltage drop across the cable to be greater than said difference.

17. The PD of claim 14, wherein the fourth circuit is implemented within a dongle coupled between the cable and the input port of the PD.

18. The PD of claim 1, wherein the fourth circuit couples the port voltage to a dummy load when the port voltage exceeds the maximum of the supported port voltage range of the PD.

19. The PD of claim 18, wherein a value of the dummy load is selected according to a class of the PD.

20. The PD of claim 1, further comprising:
a pulse width modulation (PWM) controller.

* * * * *